Patented Dec. 26, 1950

2,535,131

UNITED STATES PATENT OFFICE 2,535,131

PROCESS FOR BROMINATING p-TOLUYL BENZOIC ACID

Ivan Gubelmann, Wilmington, Del., assignor to E. I. du Pont de Nemours and Company, Wilmington, Del., a corporation of Delaware No Drawing. Application November 17, 1949, Serial No. 128,020

2 Claims. (Cl. 260—517)

This invention relates to an improved process for brominating p-toluyl benzoic acid and has for its object to provide a method in which p-toluyl benzoic acid can be brominated in a simple and economical manner to produce high yields of 3'-bromo-4'-methyl-2-benzoyl benzoic acid of good purity.

While various methods have been disclosed for producing 3'-bromo-4'-methyl-2-benzoyl benzoic acid, they involve the use of starting materials, reagents or conditions which make the cost of this dye intermediate relatively high.

I have found that p-toluyl benzoic acid can be readily brominated to give 3'-bromo-4'-methyl-2-benzoyl benzoic acid in high yields and of good purity by a bromination procedure which involves relatively inexpensive reagents and conditions which are particularly suitable for large scale production. According to the present invention the bromination is carried out by dissolving an alkali metal salt of the p-toluyl benzoic acid, such as the sodium salt, in water containing also in solution a bromine liberating compound, preferably a bromate-bromide salt mixture such as generally referred to as "Bromine salt" (see Thorpe's "Dictionary of Applied Chemistry," 4th Edition, vol. II, page 117), and slowly adding this solution of the p-toluyl benzoic acid and brominating agent to a dilute acid (preferably sulfuric acid) under good agitation. In this manner the bromination of the p-toluyl benzoic acid is essentially completed at the moment of contact of the solution with the acid, and under these conditions the 3'-bromo-4'-methyl-2-benzoyl benzoic acid, which does not readily form under conventional methods of bromination of the free acid, is readily formed in a high state of purity.

The following example is given to illustrate the invention. The parts used are by weight.

Example

A solution of p-toluyl benzoic acid sodium salt is prepared by dissolving 100 parts of p-toluyl benzoic acid and 16.8 parts of sodium hydroxide flake in 1000 parts of water; then 68 parts of "Bromine salt" ($NaBrO_3 \cdot 2NaBr$) are added and dissolved. In an open reaction vessel 4000 parts of approximately 10% sulfuric acid are heated to 90° C. The above p-toluyl benzoic acid-"Bromine salt" solution is then added to the acid in a slow, steady stream under good agitation at a temperature of from 88° to 92° C., over a period of three hours. At the end of the addition, excess bromine is destroyed by the addition of sodium bisulfite, and the 3'-bromo-4'-methyl-2-benzoyl benzoic acid, isolated by filtering and washing, is obtained in a practically theoretical yield. The product melts at 177° to 179° C. and contains 24.9% bromine.

To prevent preliminary reaction of the brominating agent on the p-toluyl benzoic acid, it is of course essential that the solution of the p-toluyl benzoic acid and the bromate-bromide salt mixture be neutral or alkaline, or, in other words, it should not be acid. The degree of alkalinity is immaterial, although excessive alkalinity of course is unnecessary and requires a correspondingly large amount of acid to neutralize it before the bromine is liberated as the solution is poured into the dilute acid. The bromate-bromide solution ("Bromine salt," or corresponding mixture) should be employed in an amount so that bromine will be available in from 20% to 50% excess of the theoretical amount required for the monobromination of the p-toluyl benzoic acid. The prepared solution of the p-toluyl benzoic acid and the bromate-bromide salt mixture is preferably added in a slow controlled stream to a large excess of the dilute acid, preferably sulfuric acid, under good agitation and at such a temperature and rate that the bromination is essentially completed on contact of the salt solution with the dilute acid solution.

It will of course be recognized that the conditions may be varied over wide limits without appreciably affecting the course of the reaction. The sulfuric acid employed in the example above given may be from 3% to 40% acid for satisfactory operation, although more concentrated acid may be used if desired. The amount of this dilute acid may vary from 1000 to 8000 parts per 100 parts of p-toluyl benzoic acid to be brominated. The sulfuric acid may of course be replaced by other dilute mineral acids such as phosphoric, hydrochloric, nitric, etc., although for practical purposes sulfuric acid is preferred. The reaction is preferably carried out at temperatures of from 75° to 100° C. The 100 parts of p-toluyl benzoic acid and the 68 parts of "Bromine salt" as employed in the example may be dissolved in from 200 to 2000 parts of water, and the rate of addition of this solution to the dilute acid may vary from one-half hour to ten hours with substantially the same result being obtained.

While the preferred brominating agent to be employed in this process is the sodium bromate-sodium bromide mixture referred to in literature as "Bromine salt" and which contains approximately one mol of sodium bromate to two mols of sodium bromide, it will be obvious that any other proportion of the bromate-bromide may be employed as long as there is sufficient bromate to liberate bromine in an amount required for monobromination of the p-toluyl benzoic acid. For substantially complete utilization of the bromine present in the mixture, the proportion normally present in the "Bromine salt" has been found to be satisfactory. It will also be obvious that potassium bromate or potassium bromide may be substituted for the corresponding sodium salts.

Since p-toluyl benzoic acid does not readily brominate by the usual methods employed in the bromination of organic compounds, the method of this invention provides a simple and economical process for producing this compound in high yields and of good purity. It has been found that the monobromination of p-toluyl benzoic acid when brominated by the addition of bromine to an acid suspension thereof does not go to completion, and the addition of a bromate-bromide salt mixture to an acid suspension of the p-toluyl benzoic acid gives a bromination product which is much inferior to that obtained by the process as above described.

The present process offers the advantage of carrying out the bromination in a very short period of time without the presence of high concentrations of bromine or oxidizing agents or the use of strong sulfuric acid. This permits the completion of the bromination without appreciable formation of side products. This process offers the further advantage that, when desired, the aqueous solution of the alkali metal salt of the p-toluyl benzoic acid produced during the isolation of the free acid, as more particularly described in U. S. Patent 1,713,569, may be employed directly, in place of isolating and then reconverting the isolated p-toluyl benzoic acid to the salt.

I claim:

1. A process for preparing 3'-bromo-4'-methyl-2-benzoyl benzoic acid which comprises dissolving p-toluyl benzoic acid as an alkali metal salt in a non-acid aqueous solution in which a mixture of an alkali metal bromide and an alkali metal bromate is dissolved in an amount sufficient to effect monobromination of the p-toluyl benzoic acid with an excess of from 20% to 50%, slowly adding this solution to a dilute mineral acid under good agitation and at such a rate and temperature that bromination is essentially completed at the time of contact of the solution with the acid.

2. A process for preparing 3'-bromo-4'-methyl-2-benzoyl benzoic acid which comprises dissolving 100 parts of the sodium salt of p-toluyl benzoic acid in 1000 parts of water in which there is dissolved 68 parts of a sodium bromate-sodium bromide mixture containing approximately 2 mols of sodium bromide per mol of sodium bromate, and slowly adding this solution to a solution of dilute sulfuric acid at a temperature of from 75° to 100° C., and isolating the resulting 3'-bromo-4'-methyl-2-benzoyl benzoic acid.

IVAN GUBELMANN.

REFERENCES CITED

The following references are of record in the file of this patent:

FOREIGN PATENTS

| Number | Country | Date |
| --- | --- | --- |
| 205,218 | Germany | Dec. 18, 1908 |
| 540,408 | Germany | Dec. 18, 1931 |